UNITED STATES PATENT OFFICE.

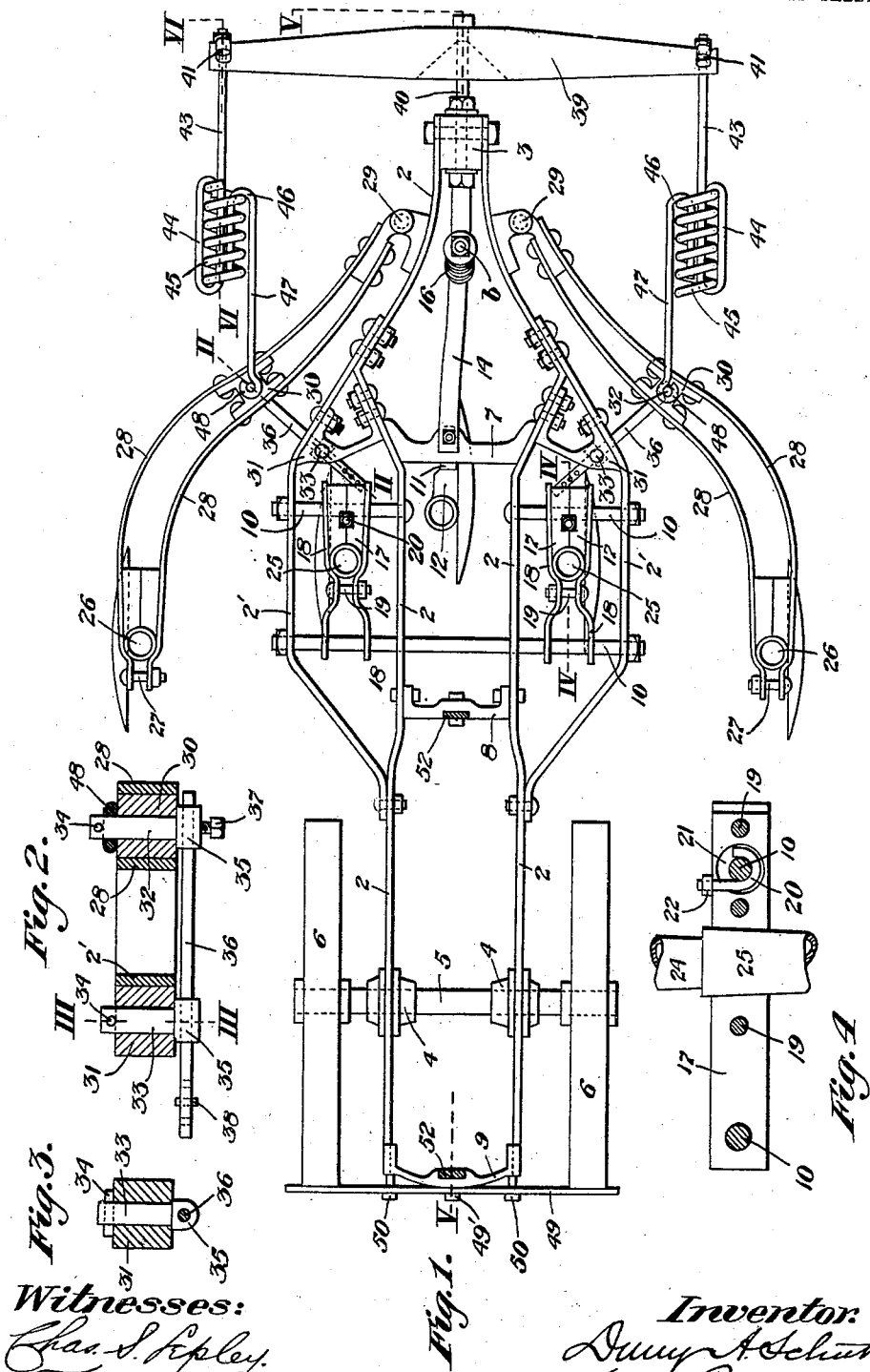

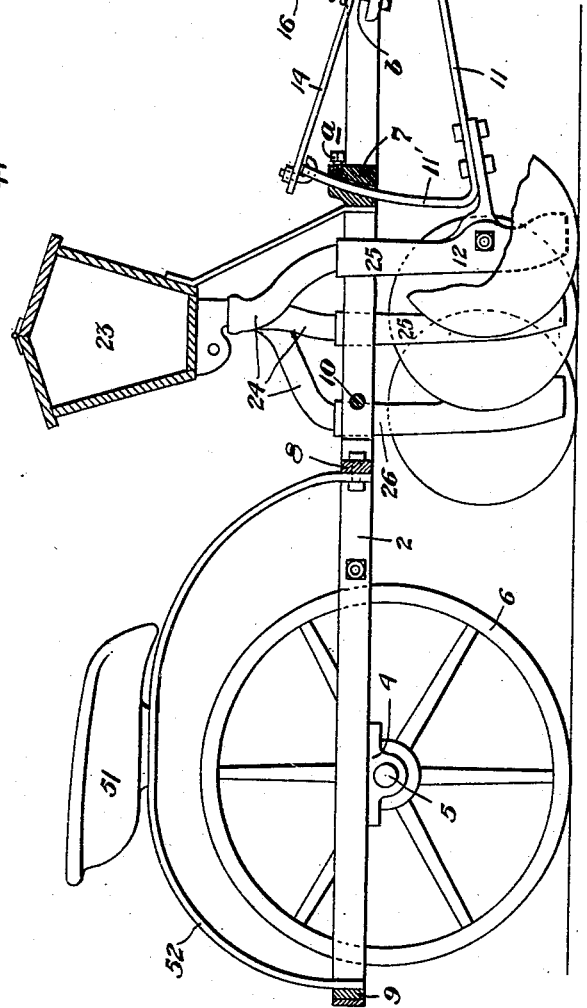

DUNY A. SCHUTT, OF PERU, INDIANA.

GRAIN-DRILL.

No. 903,896.  Specification of Letters Patent.  Patented Nov. 17, 1908.

Application filed September 16, 1907. Serial No. 393,187.

*To all whom it may concern:*

Be it known that I, DUNY A. SCHUTT, a citizen of the United States, residing at Peru, in the county of Miami and State of Indiana, have invented certain new and useful Improvements in Grain-Drills, of which the following is a specification, reference being had therein to the accompanying drawing.

My invention refers to improvements in grain drills and has for its object to provide a drill having disk hangers and disks so arranged that they may be adjusted or set laterally of the machine, and with the outside disk hangers mounted in automatically adjustable wings.

The apparatus is designed for automatic adjustment by means of the spring connections between the outer disk hanger wings and the swingle tree of a one-horse machine, for working around corn hills or where the conditions require adjustment.

The invention is more fully illustrated in the accompanying drawings, in which:

Figure 1 is a plan view of the framework showing the mounting and connections of the disk hanger wings. Fig. 2 is an enlarged sectional detail view on the line II. II. of Fig. 1. Fig. 3 is a cross section on the line III. III. of Fig. 2. Fig. 4 is a sectional view on the line IV. IV. of Fig. 1. Fig. 5 is a longitudinal vertical section on the line V. V. of Fig. 1. Fig. 6 is a detail sectional view on the line VI. VI. of Fig. 1. Fig. 7 is a detail view showing the hanger mounted on the end post.

The main framework of the machine is constructed of bars 2 connected together as shown in Fig. 1 secured to the hitch post 3 at the front of the machine, extending backwardly and supported by suitable bearings 4 on the axle 5 having the usual traction supporting wheels 6. 6. At each outer side at the middle portion of the machine are supplemental frame bars 2' connected with the main bars 2 with intervening spaces arranged to provide for the mounting of the disk hangers at each side of the middle disk hanger, which is mounted at the middle portion of the machine between the main bars 2, as clearly shown in Fig. 1. The main bars 2 are connected and braced by spreader blocks or castings 7, 8 and 9 respectively, stiffening the frame and providing supports for the middle disk hanger drag bar and the seat spring respectively, while the main bars 2 and outer bars 2' are also connected by bars or bolts 10, 10 upon which the disk hangers adjacent to the middle hanger are adjustably mounted.

11 is the drag bar for the middle disk hanger 12 pivotally depending below and behind the hitch post 3 from a bearing block 13 at the lower end of the post, extending backwardly therefrom as shown in Fig. 5 and resiliently supported below an upper spring bar or plate 14 by an extension 11' of bar 11 or by a corresponding additional bar secured to said bar. The disk hanger bar 11' passes upwardly through an aperture in block 7 in which it may freely play vertically, or in which it may be secured by a set screw *a* as desired. This manner of mounting of the bar 11' braces the drag bar against lateral movement. Bar 14 is also secured at front in a suitable socket in bearing block 13 and is connected at its rear end to the upper end of bar 11' of the disk hanger. The disk hanger is normally pressed downwardly by a spring 16 surrounding bolt *b* passing through flange 15 of the bearing block 13 and having a terminal adjusting nut whereby downward pressure is exerted towards the ground. By this means disk hanger 12 is capable of considerable vertical play and the desired pressure is secured by spring 16 and spring plate 14.

The next outermost disk hangers are mounted at each side of the middle hanger in the spaces between bars 2 and 2' in divided frames 17, 17, held between bars 18, 18 by bolts 19, the bars 18 being slidingly mounted on bolts 10 so that they may be moved in or out to the desired distance. The frames 17 are clamped in place by hooked bolts 20 located in clearance openings 21 in the castings of frames 17 and provided with nuts 22 by which the bar 10 and the hanger frames may be rigidly clamped together, as in Fig. 4.

23 is the grain box of any suitable construction from which by flexible tubes 24 the grain is fed to the hollow-necks 25 of the hangers, and the necks of the hangers just described are tightly clamped between frames 17 and 18 by the bolt 19. As thus constructed these hangers may be bodily shifted and located at the desired position, within considerable latitude.

The hollow necks of the outermost disk hangers 26 are clamped in a similar manner by bolts 27 between the backwardly extending terminals of double bars 28, 28, outwardly curved, connected at their front ends and pivoted at 29 to hinge bearings secured at each outer side of main frame bars 2 a short distance back of the hitch post 3. The bars 28 of each pair are connected between their ends by blocks 30, while braces 31 connect bars 2 and 2' at their forward portions, and each block 30 and brace 31 is provided with a vertical hole.

32 and 33 are bolts mounted in said holes by cotter pins 34 and having at their lower ends T heads 35 having transverse holes to receive a limiting bar 36. Said bar is secured in head 35 of bolt 32 by set screw 37 or otherwise and is provided at the other end beyond bolt 33 with a plurality of holes, in one of which is inserted a limiting pin 38. By this means it will be seen that the wing frame composed of bars 28 may swing inwardly or outwardly on its hinge 29 to the extent desired, and an important and valuable feature of the invention is that the swing of the wings and resulting movement of disk hangers 26 is controlled by the pull of the draft rigging.

39 is the swingle tree connected at suitable height to the hitch post 3 by bolt 40 and provided at each end with the usual trace hooks 41 and also downwardly depending lugs 42. Between the ends of the swingle tree and the swinging hanger bar wings, are interposed spring connections, so that the wings will be thrown outwardly by the pull of the horse, and will be automatically depressed backwardly by contact with the ground when the pull is released, as in turning around. The spring connection at each side consists of a rod 43 connected to lug 42 extending backwardly and provided with a loop 44 embracing one side of a coiled spring 45. The spring is also engaged in a reverse direction by the reversed U shaped terminal 46 of a rod 47 extending backwardly and connected by an eye 48 at its other end with bolt 32. By this means, when the pull is exerted on the swingle tree, the wings 28 and their disk hangers will be extended, but with an intervening cushioning resistance, giving more or less resiliency to the wings, while the wings are free to swing back when the draft pressure is released. This elastic feature of the outermost disk hangers permits of the use of the machine with great facility and renders the operation automatic.

49 is a spring blade scraper, secured to back brace 9 by bolt 49' and adjustable towards the wheels 6 by cap screws or bolts 50 tapped into the brace at each side, for cleaning the wheels.

51 is the driver's seat mounted above the wheels upon arched spring 52, and it will be understood that the machine is provided with suitably actuated feeding mechanism for the grain or other features of detail construction common to machines of this class.

The advantages of the invention will be readily understood and appreciated by all users of this class of machinery. The automatic adjustability of the outermost hangers with their spring connections to the swingle tree and the lateral adjustability of the intermediate hangers give a wide range of adjustment which greatly increases the adaptability of the machine in use, while the construction as a whole is simple, strong and economical, composed of few parts and capable of long continued use.

The design or proportions may be changed or varied by the skilled mechanic, as by varying the number or arrangement of the disks and hangers, or in other features, and I do not desire to be limited to the exact construction shown and described.

What I claim is:

1. A grain drill provided with laterally swinging wings provided with disk hangers, and forwardly pulling springs connected with the wings.

2. A grain drill provided with draft gearing, laterally swinging wings provided with disk hangers, and spring connections between the draft gearing and the wings.

3. A grain drill provided with draft gearing, laterally swinging wings provided with disk hangers, spring connections between the draft gearing and the wings, and means limiting the outward swing of the wings.

4. In a grain drill, the combination with the main frame, of a laterally swinging frame provided with a disk hanger, draft gearing connected with the main frame, and a spring connection between the draft gearing and the wing.

5. In a grain drill, the combination with the main frame, of laterally swinging wing frames hinged to the main frame and provided with disk hangers, draft gearing connected with the main frame, and spring connections between the draft gearing and the wings.

6. In a grain drill, the combination with the main frame, of laterally swinging wing frames hinged to the main frame and provided with disk hangers, draft gearing connected with the main frame, and spring connections between the draft gearing and the wings, and means limiting outward travel of the wings.

7. A grain drill provided with supporting wheels and a main frame having disk hangers at its middle portion and a swingle tree, and provided with outwardly swinging disk hanger wings at each side connected with the swingle tree by means embodying springs.

8. In a grain drill, the combination with the swinging hanger frame and the swingle tree, of a spring, and rods connected to the spring and to the swinging frame and swingle tree respectively.

9. In a grain drill, the combination with the main frame having a depending eye bolt bearing and a laterally adjustable hanger frame and means for exerting forwardly pulling tension thereon, of a bolt fixedly secured in the hanger frame and engaging the eye bolt bearing, substantially as set forth.

10. In a grain drill, the combination with the main frame having a depending eye bolt bearing and a laterally adjustable hanger frame and means for exerting forwardly pulling tension thereon, of a bolt fixedly secured in the hanger frame and engaging the eye bolt bearing at one end and connected with the tension exerting means at the other end, substantially as set forth.

11. In a grain drill, the combination with the main frame having a depending eye bolt bearing and a laterally adjustable hanger frame and means for exerting forwardly pulling tension thereon, of a bolt fixedly secured in the hanger frame and engaging the eye bolt bearing and provided with an adjustable stop device for limiting the outward travel of the swinging frame, substantially as set forth.

12. The combination with the hanger, of the hanger frame consisting of oppositely disposed castings arranged to embrace the neck of the hanger, outer bars on each side of the castings and also arranged to embrace the hanger neck, a transverse securing bolt, and a vertically arranged bolt located between the castings and having a terminal hook.

13. The combination with the main frame provided with an upper hitch post and a bearing block, of a drag bar pivoted to the hitch post and having a portion extending upwardly through said bearing block, a rearwardly extending spring bar connected with said portion and mounted at its front end in a retaining socket, and spring mechanism adapted to press the spring bar and drag bar downwardly, substantially as set forth.

14. The combination with the main frame provided with a bearing block and the hitch post, of an upper spring bar, a drag bar pivoted to the hitch post and having a portion extending upwardly through said bearing block, and a spring arranged to press the spring bar and drag bar downwardly.

15. The combination with the main frame, provided with a bearing block and the hitch post, of an upper spring bar, a drag bar pivoted to the hitch post and having a portion extending upwardly through said bearing block, and a spring arranged to press the spring bar and drag bar downwardly with means for fixedly securing the drag bar in position.

16. The combination with the main frame having a vertically apertured guide, of a pivoting bearing block secured to the front of the frame and provided with a rearwardly extending arm, an upper backwardly extending spring plate, a bolt passing through said arm and spring plate and provided with a spring, and a drag bar attached to the pivoting bearing block and provided with a disk hanger, and having an upwardly extending arm passing through said apertured guide and secured to the spring plate.

In testimony whereof I affix my signature in presence of two witnesses.

DUNY A. SCHUTT.

Witnesses:
J. F. WHITE,
G. W. MONROE.